United States Patent [19]

Bland

[11] Patent Number: 5,206,169
[45] Date of Patent: Apr. 27, 1993

[54] ANIMAL CARCASS COMPOST CRIB

[76] Inventor: Robert O. Bland, 8015 Brandon St., Little Rock, Ark. 72204

[21] Appl. No.: 769,935

[22] Filed: Sep. 30, 1991

Related U.S. Application Data

[63] Continuation-in-part of Ser. No. 517,047, May 1, 1990, abandoned.

[51] Int. Cl.⁵ .................. C05F 1/00; C05F 11/08; B09B 3/00
[52] U.S. Cl. ........................... 435/284; 435/287; 435/312; 435/314; 435/315; 435/316; 435/818; 422/184; 422/198; 422/225; 422/227; 422/239; 422/240; 210/210; 210/219; 71/9
[58] Field of Search .................. 435/284–287, 435/312–316, 818; 422/184, 187, 198, 225, 227, 239, 240; 210/219, 210; 71/8, 9, 10

[56] References Cited

U.S. PATENT DOCUMENTS

| | | | |
|---|---|---|---|
| 1,029,378 | 6/1912 | Lawton | 71/9 |
| 1,872,024 | 8/1932 | Bates | 71/9 |
| 2,474,833 | 7/1949 | Eweson | 71/9 |
| 2,867,521 | 1/1959 | Jeffreys | 71/9 |
| 3,138,447 | 6/1964 | Eweson | 71/9 |
| 3,248,175 | 4/1966 | Emmet | 23/259.1 |
| 3,617,236 | 11/1971 | Elias | 71/9 |
| 3,718,451 | 2/1973 | Baumann | 71/9 |
| 3,837,810 | 9/1974 | Richards et al. | 23/259.1 |
| 3,890,129 | 6/1975 | Chester | 71/9 |
| 4,174,371 | 11/1979 | Bell et al. | 422/109 |
| 4,184,269 | 1/1980 | Kneer | 34/168 |
| 4,193,786 | 3/1980 | Brill | 71/9 |
| 4,204,959 | 5/1980 | Kreuzburg et al. | 210/195.1 |
| 4,221,571 | 9/1980 | Rhoades | 422/184 |
| 4,236,910 | 12/1980 | Norin et al. | 71/9 |
| 4,317,671 | 3/1982 | Willisch | 71/9 |
| 4,343,907 | 8/1982 | Graefe | 435/313 |
| 4,384,877 | 5/1983 | Nemetz | 71/9 |
| 4,384,878 | 5/1983 | Nordlund et al. | 71/9 |
| 4,501,604 | 2/1985 | Odaira | 71/8 |
| 4,608,175 | 8/1986 | Nuttle | 210/532.2 |
| 4,632,692 | 12/1986 | Lebesque et al. | 71/10 |
| 4,687,645 | 8/1987 | Harvey | 422/184 |
| 4,710,032 | 12/1987 | Nordlund | 366/156 |
| 4,797,367 | 1/1989 | Pinder | 435/313 |
| 4,984,561 | 1/1991 | Warrington | 126/417 |

Primary Examiner—Lynn M. Kummert
Attorney, Agent, or Firm—Robbins & Robbins

[57] ABSTRACT

A compost crib is provided for the on-site disposal of animal carcasses accumulated during commercial operations, in which passive solar energy is utilized to assist in the decomposition process. Aerobic, thermophilic bacteria multiply in the sunlight, solar heat and heat of decomposition and convert nitrogenous material in carcasses and manure, as well as the carboniferous cellulose additive to the compost, to a bacterial biomass. The crib is simple in construction, having a frame with mesh walls to allow for adequate exposure to air. Access doors are provided for loading carcasses and for unloading recycled compost material for rotation back onto the compost mass. Solar panels are provided in the roof for the generation of solar heat and to provide sunlight to aid in bacterial photosynthesis.

6 Claims, 3 Drawing Sheets

ANIMAL CARCASS COMPOST CRIB

RELATED APPLICATION

This application is a continuation-in-part of copending application Ser. No. 517,047, filed May 1, 1990, now abandoned.

BACKGROUND OF THE INVENTION

This invention utilizes the age-old science of composting to volatilize and pasteurize animal tissues, some of which may be diseased and potentially pathogenic to humans. The process of this invention renders these animal tissues and manure safe and in fact suitable for use as a beneficial soil amendment. Concerns about large-scale pollution of water and soil by industry practices in areas like chicken and fish production demand workable solutions. Much of this waste is presently being cast directly into these waters and soil, making a serious threat to the safety of groundwater, air quality, soil, and fish and game.

Heretofore, all composting has been designed and practiced to provide the highest possible end product of organic fertilizer. The invention instead modifies and utilizes these established composting principles to achieve the primary goal of the safe disposal of animal wastes. The compost end product of this process is still of value, but the precise constituents are not of primary importance.

The past prior art is described in part in the very comprehensive study *The Complete Book of Composting*, published by Rodale Books, Inc., Emmaus, Pa., June 1974. Without exception, the composting devices and processes described in the history of this science have been designed to regulate the putrefaction of organic wastes to the end that nitrogen be fixed in the soil and compost. This is required to make the best organic fertilizer.

This science was first systematized by Sir Albert Howard in 1925-35 in India. He tested a layered pile, about 1.5 meters high, of garbage, animal wastes, sewage sludge, straw and leaves, turning it over twice in a 3 month composting period. In 1981, James A. Merkel, formerly Associate Professor, Department of Agricultural Engineering, University of Maryland, stated, in his book *Managing Livestock Wastes*, that there were two existing composting systems: first, enclosed digesters and secondly, windrows. He said: "enclosed digesters require a high capital investment and utilize a great deal of energy." This comment characterizes almost all of the existing patented prior art. Windrows he described as "nothing more than elongated piles that are turned periodically to aerate the organic wastes." Such a system in most climates with rainfall would require a large shed type roofed structure.

Rapidly growing awareness of the environmental pollution caused by the various agricultural waste disposal practices has created a new interest in the possible use of composting as one solution to these problems. Recent research at the Department of Poultry science, University of Maryland, Princess Anne, Md.; the University of Delaware College of Agriculture Science, Agricultural Experiment Station, Cooperative Extension, Newark, Del.; and Cornell University Department of Agriculture Engineering, Cornell Cooperative Extension, Rochester, N.Y. has resulted in the development of physical facilities and processes in pilot projects to compost chicken carcasses. These prototypes are now being proposed for massive replication wherever disposal of chicken carcasses poses a problem.

A comparison of the construction details of the Maryland, Delaware and Cornell pilot projects and the Rodale history clearly demonstrates the fact that the newer versions have borrowed directly from the older composting principles. These details include: 1) a "bin" concept (roughly 2.44 meters by 1.52 meters) contained by four walls that facilitate compost piling to a depth of 0.9 meters or thereabouts; 2) "layering" technique specifying straw, dead birds and "manure" (probably broiler litter—a combination of manure and sawdust) in alternate applications; and 3) open to the air on top of the pile. This is the main source of oxygen for the necessary aerobic decomposition.

This repetition of the historic details and practices of organic composting in an attempt to dispose of animal wastes has led to certain inefficiencies and complications. These include: first, the deficiency of adequate oxygen to support aerobic decomposition, particularly in the center of the pile. This has created the necessity, as stipulated in the Maryland and Delaware procedures, to "turn" (aerate) the pile with a front end loader machine once or twice in the process. This is necessary because of the development of anaerobic "pockets" of material deep in the pile that must be mechanically exposed to air in order to convert this unwanted bacteria into aerobic.

The second complication is in the "layering" process that utilizes straw in an attempt to conduct air to the center of the pile. This could be problematical in that the straw can become compressed and water-logged and not facilitate the flow of air. Further, this material may be a deterrent to the process by being extremely slow in breaking down in the composting process.

The third question about the Maryland and Delaware designs is that in being open at the top there does not seem to be a security against raids by dogs and varmints. In the very likely event that parts of animal carcasses are exposed in the pile, this could attract a variety of domesticated and wild animals to raid the pile.

Lastly, these pilot projects entail a costly, customized construction for each poultry operation. This includes a concrete floor, a structural frame and roof and treated lumber sidewalls. The cost of these structures are admittedly a deterrent in reaching the desired goal of widespread composting of animal wastes in an effort to clean-up the environment.

SUMMARY OF THE INVENTION

The invention overcomes these difficulties in the following manner: first, the ventilation system through, around and on top of the composting material supplies the 506 to 618 cubic meters of air per ton of composting material per day that is required, according to Clarence G. Golueke, in his book *Composting: A Study of the Process and its Principles*, Rodale Press, 1972. This is achieved through wire mesh walls and by providing perforated air ducts disposed transversely within the bin. The invention improves on these prior techniques in first, elongating the exposure of the perforated vent pipe to the largest possible amount of composting material and secondly, tilting this vent pipe in a manner to generate an air flow. This is caused by the heat of decomposition creating a "chimney" effect. The result of this improvement is the successful removal of any excess moisture that might interfere with aerobic development, as well as furnishing adequate oxygen to the pile.

Secondly, the invention does not employ straw for the reasons stated above and instead relies solely on a mixture of manure and sawdust (broiler litter right off the floor in growing out houses) as the "layering" material. Chicken carcasses are placed on a bed of such litter and covered over with the same material, and so on to whatever depth is required. Nitrogen-rich materials, such as cottonseed meal, are added to accelerate the break-down of the cellulose component in the sawdust of the litter. This facilitates the growth of bacteria, fungi and soil animals that hastens the decomposition and disposal of the dead bird tissues, bones, feathers and manure.

Lastly, the invention is economical to produce because of compactness, off-site production and portability. The crib is constructed of common hardware materials and is simple to build. It affords the opportunity for rapid, large-scale implementation of a device and process that may provide a solution to a part of the problem of the disposal of animal waste and manure.

In summary, the invention overcomes the deficiencies in the prior art of the most recent designs to dispose of animal wastes. These deficiencies are: inadequate oxygen supply; bulky layering in overly-large bins requiring heavy equipment to handle; exposure to raiding animals and unnecessarily high capital and labor costs.

Also, in comparison to the cited prior art, the invention is concerned with providing for the disposal and volatilization of animal waste. The prior art eschews such wastes and is designed to handle organic (plant derived, mainly) waste.

It is in precisely this step in the process that the invention is unique in comparison to all the prior art. The need to facilitate the disposal of the animal carcasses takes precedence here over the production of an end-product fertilizer. The combination of oxygen supply, solar heat, sunlight, moisture removal, and supply of extra nitrogen as an inoculant interact to maximize and speed the biological growth. This growth converts animal tissues and manure to carbon dioxide gas, water vapor and the stabilized compost components of nitrogen, phosphorus, potassium, and calcium. This speed-up is counter to composting theory in that it allows too much of the nitrogen to escape in its ammonium form. However, the rapid and environmentally safe disposal of animal wastes is achieved by this process, and the extra escaping ammonia is not an environmental liability.

In addition, the invention is unique in its utilization of sunlight (in addition to the thermal solar heat) to accelerate the decomposition process. The rate of growth of certain types of bacteria, fungi, algae (plant life) and the critical micro-organism, protozoa, all of which are found at times in composting material, are dependent upon photosynthesis. The solar panel in the invention provides maximum, intense sunlight to spur the growth of these entities and thereby hasten the decomposition process and reduce the bulk and thereby the labor required to handle the end compost product. This is brought about in part by the proliferation of thermophilic actinomycetes that increase their growth rates hundreds-fold as the temperatures rise above 50° C. Studies have shown that these bacteria are capable of decomposing cellulose. This is of critical importance in breaking down the slowly decomposing sawdust component into organic material that feeds the microorganisms, as well as assisting in the reduction of the bulk in the pile.

It is therefore an object of this invention to provide a low-maintenance compost crib for the safe volatilization and decomposition of animal carcasses, utilizing solar energy as a source of heat and light.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
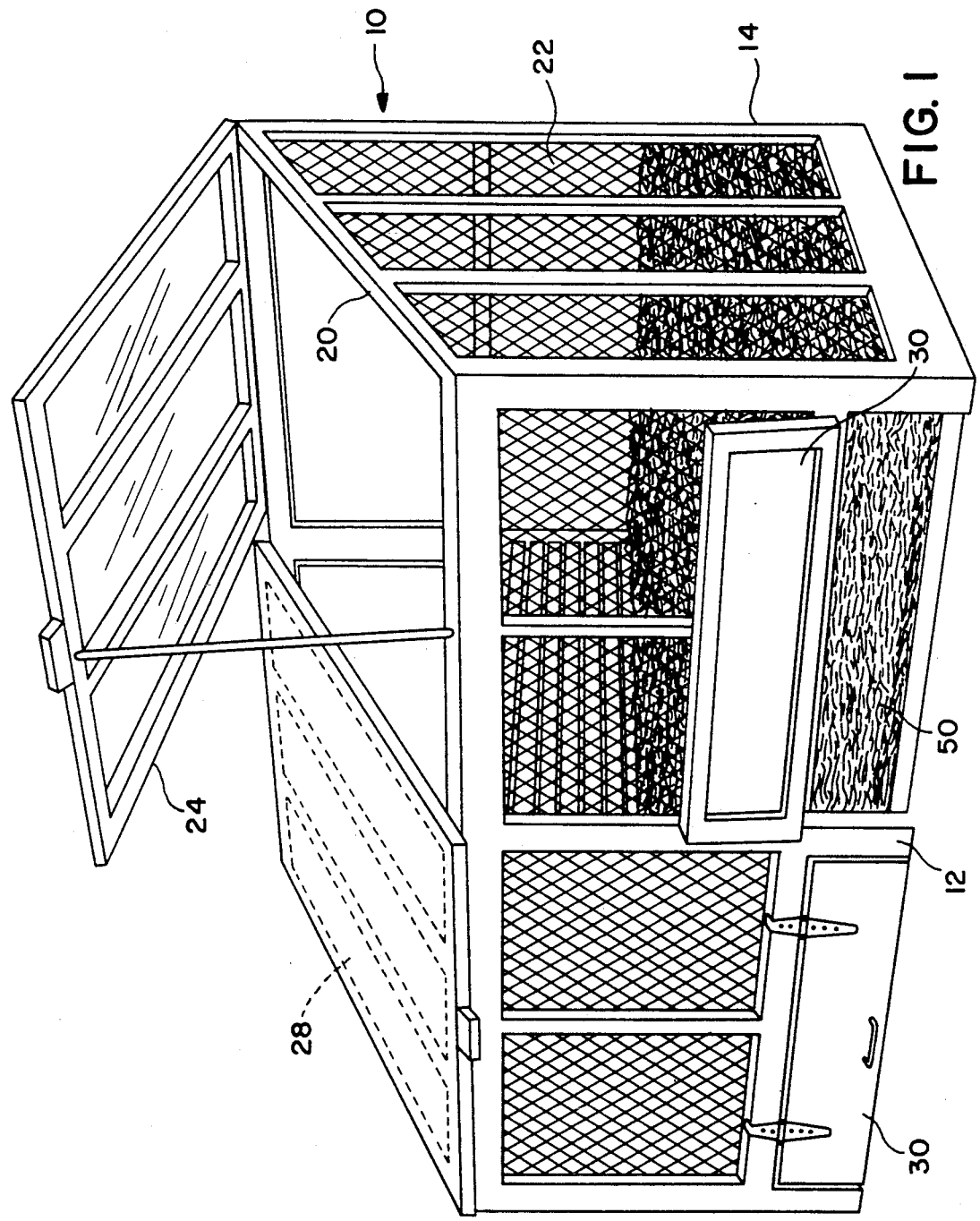
FIG. 1 is a perspective view of the animal carcass compost crib from the front.

The animal carcass compost crib of the instant invention is very simply comprised of a bin having a wood framework and is generally shown by the reference numeral 10. The crib has a front side 12, lateral sides 14 and 16, and a rear side 18. The framework has a greater height at rear side 18 than at front side 12, as shown in FIG. 2, so that the top edges 20 of lateral sides 14 and 16 have a downward slope. Wire or plastic mesh 22 spans across the framework and serves as a retaining wall. Floor 23, as seen in FIG. 4, is slightly raised from the ground and has a sloping inclination to allow for the drainage of water. It is to be understood that compost crib 10 may be constructed in the nature of a duplex as seen in FIGS. 1, 3 and 5, or as a single compartment unit.

Figure 2:
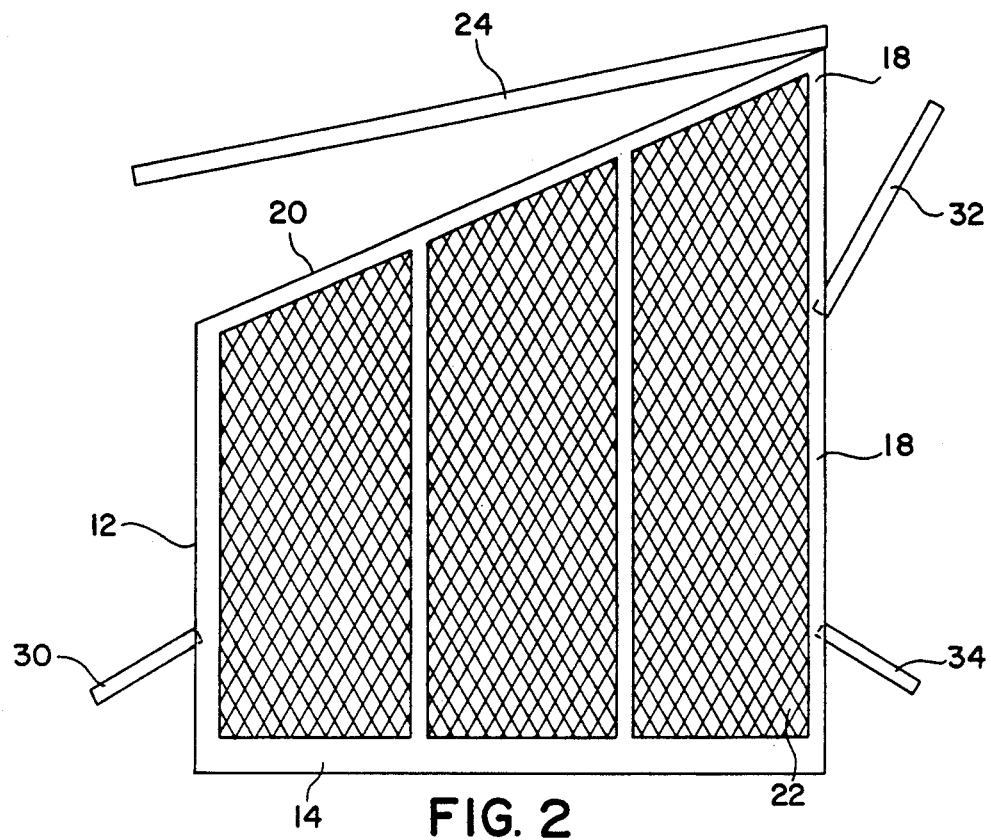
FIG. 2 is a view of the compost crib in side elevation from the side.

A top cover 24 is hingedly connected to rear side 18 as shown in FIG. 1. Solar glazing 28, or other transparent plastic material, is stretched over the framework of cover 24. Crib 10 is equipped with a plurality of access doors to facilitate the placing of carcasses and compost medium therein. FIG. 1 shows bottom doors 30 hingedly attached on front side 12. FIG. 3 shows top doors 32 and bottom doors 34 hingedly attached on rear side 18. It can be seen in FIG. 2 that top door 32 is hinged to open downward and bottom door 34 is hinged to open upward although either orientation may be used.

Figure 3:
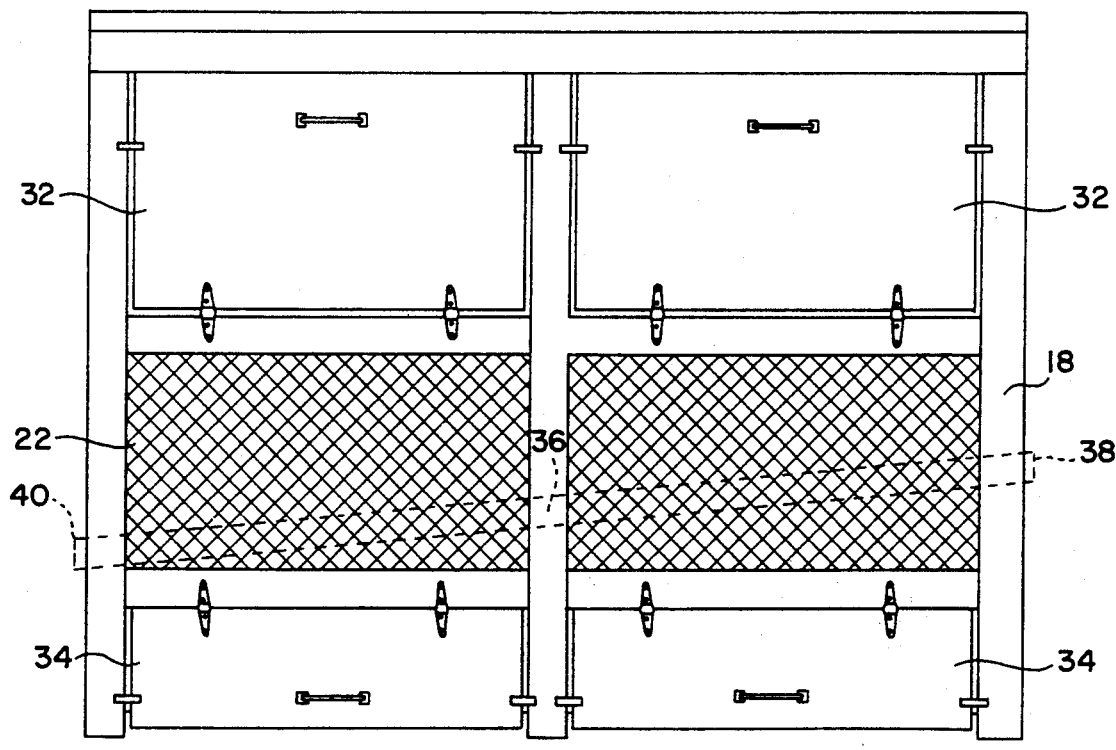
FIG. 3 is a view of the compost crib in side elevation from the rear of the crib showing the ventilation conduit.
Figure 4:
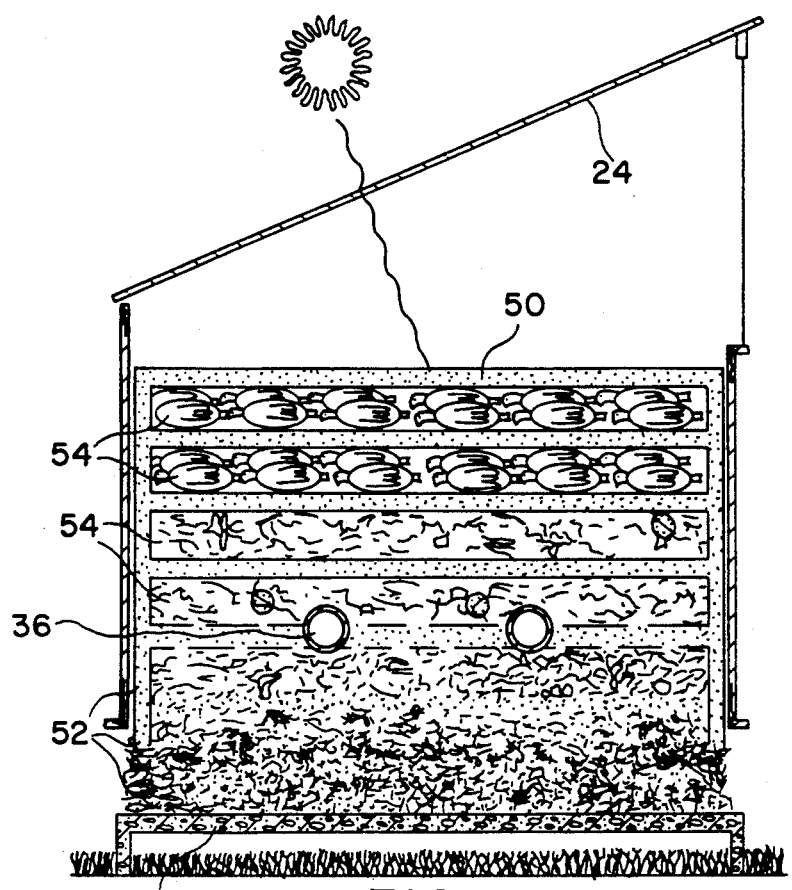
FIG. 4 is a cross-sectional view of the compost crib taken in side elevation from the side of the crib showing the contents therein.

An optional air conduit 36 having open ends 38 and 40, as shown in FIG. 3, may be positioned transversely through the crib to increase ventilation to the interior of the crib. Conduit 36 has a plurality of perforations along its entire length.

Figure 5:
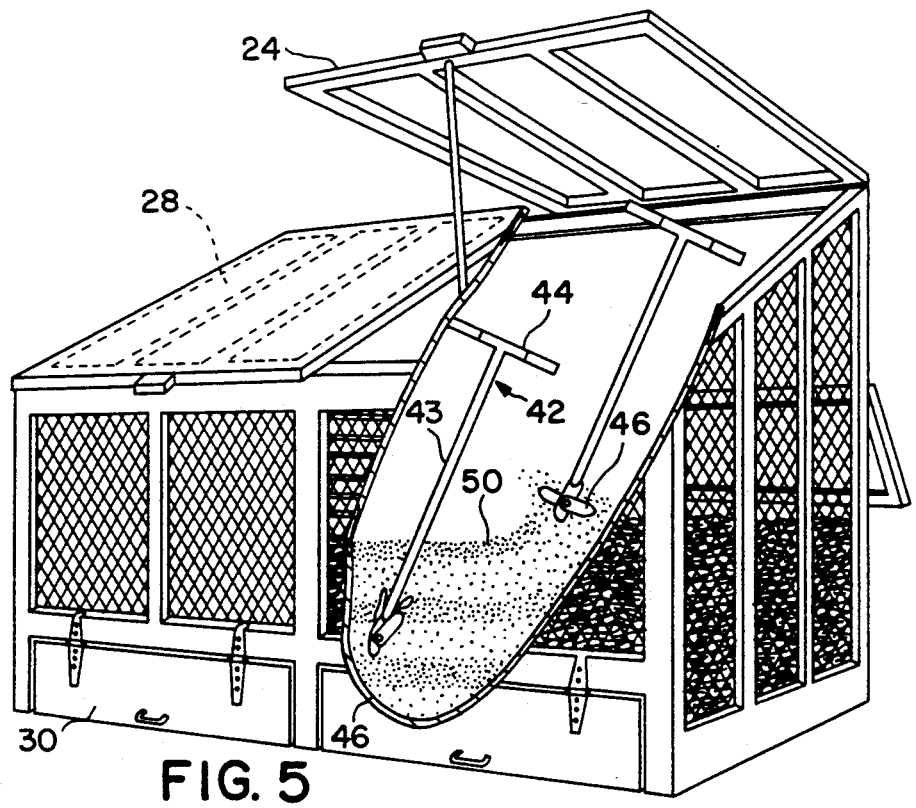
FIG. 5 is a perspective view of the crib, with the front partially broken away to show the operation of the aerating tool.

Aerating tool 42, in the form of an elongated rod 43 as seen in FIG. 5, is used supplementarily to turn the compost pile to ensure aerobic decomposition. It has handles 44 for grasping and twisting the tool. Pivotable lugs 46 are provided at the bottom end of the tool to help turn the compost material. When tool 42 is inserted in compost mass 50, as shown in FIG. 5, lugs 46 retract back against rod 43. When tool 42 is withdrawn from compost mass 50 lugs 46 pivot open to a 90° angle to create a hoe effect.

USE

The method of using the compost crib of the instant invention is very easily carried out. Although any animal carcass may be composted utilizing the invention, the instant discussion concerns the composting of chicken carcasses. An initial bed of compost starter material 52, comprising a mixture of sawdust and manure, is laid down on floor 23 as shown in FIG. 4. This mixture comprises the litter off the floor in chicken houses. Nitrogen-rich materials, such as cottonseed meal, are added to accelerate the breakdown of the cellulose component in the sawdust of the litter. This facilitates the growth of bacteria, fungi and soil animals that hasten the decomposition and disposal of the dead bird tissues, bones, feathers and manure.

Bird carcasses 54 are placed on this bed through any of the various upper access doors of crib 10. The carcasses are arranged without touching each other and are spaced away from the outside walls of the crib. The carcasses are then completely covered with compost material 52. Subsequent alternating layers of carcasses and compost material are added as shown in FIG. 4.

The compost crib of the instant invention can receive over 300 chicken carcasses per week, averaging about 0.90 kilograms each, and disposes of these carcasses in a continuous fashion. The unit must be set up outdoors, with front side 12 facing due south (in the northern hemisphere). Solar heat and light is utilized and received through solar glazing 28 and is transmitted directly to the compost mass 50 as seen in FIG. 4. Oxygen is provided to the compost mass through the mesh 22 on the sides of the crib. Additional oxygen can be transported to the interior of the mass by using the optional air conduit 36 shown in FIG. 3. Water may be added, if necessary, to the layering to supplement the decomposition process.

Periodically, the compost mass 50 will need to be "turned" so that the interior of the pile can receive oxygen. This is easily accomplished by raising top cover 24, as shown in FIG. 5, and inserting an elongated rod or the like to create channels for air to enter the pile through. Aerating tool 42 enhances this action through its pivotable lugs 46, which impart a hoeing effect to the pile.

The heat of decomposition in the compost mass 50, augmented by the passive solar heat gain, generates temperatures as high as 60° C., that destroy pathogenic bacteria in the composting process. Aided by the passive solar energy, aerobic, thermophilic, Gram-positive spore forming bacilli will multiply and convert the nitrogenous material, carcasses and parts of the compost medium, into a bacterial biomass. With a carbon to nitrogen ratio maintained between 15:1 and 30:1, decomposers will be first level consumers at the outset, consisting of bacteria, molds and actinomycetes, and most of these microorganisms will exist in differing forms throughout the entire process. These organisms will feed the second level consumers, consisting of organisms like beetle mites, mold mites, springtails, rotifers, etc. The third and final level of consumers will be ground beetles, rove beetles and other larger soil animals that will substantially complete the decomposition process.

Recycling of old compost material at the bottom of the crib is easily accomplished by removing through bottom access doors 30 and 34, and placing back on the pile through rear access door 32 or top cover 24.

Other variations of the instant invention are possible. For example, the design could be increased in capacity to accommodate larger animal wastes, such as hogs. It could also be slightly modified in shape to accommodate machinery such as front-end loading equipment in the operations.

Various changes and modifications may be made within this invention as will be apparent to those skilled in the art. Such changes and modifications are within the scope and teaching of this invention as defined in the claims appended hereto.

What is claimed is:

1. A method for composting animal carcasses, said method comprising depositing a layer of compost starter material within a crib enclosure, said enclosure being comprised of walls having mesh siding to expose an interior of said enclosure to oxygen from the air surrounding said crib, and a sloping floor for the drainage of water, said starter material comprising a nitrogen-rich component, placing a layer of carcasses on said layer of compost starter material, completely covering said layer of carcasses with a compost medium, said medium being comprised of sawdust and animal waste, placing subsequent alternating layers of said carcasses and said compost medium to fill said crib enclosure, exposing the contents of said filled crib to solar heat and direct light generated by solar glazing panels provided on said crib and introducing air to an interior of said contents to facilitate aerobic decomposition, air being introduced into said interior of said contents by inserting and extracting an aerating tool whereby a furrow through which air passes is created, said tool comprising an elongated rod, said contents further being rotatively mixed by extracting a bottom portion of said crib contents through a door at a bottom of said crib and inserting said bottom portion onto a top of said crib contents, whereby said contents are effectively aerated, whereby said carcasses are decomposed.

2. The method for composting animal carcasses according to claim 1 in which said tool has a handle at one end of said elongated rod and retractable lugs at another end, said lugs having means to be in a retracted, co-directional alignment with said rod when said rod is inserted into said crib contents and in an extended, perpendicular alignment with said rod when extracted from said contents, whereby said contents are turned by said lugs when said tool is extracted.

3. The method for composting animal carcasses according to claim 1 in which a conduit is disposed transversely through said crib, said conduit being perforated along a length thereof and having open ends exposed exteriorly of said crib, whereby air is introduced to said crib contents and excess water removed therefrom for effective aerobic decomposition.

4. A crib for composting animal carcasses, said crib comprising a framework for receiving carcasses defining four walls, a top cover and a floor, a rear wall of said framework being greater in height than a front wall of said framework whereby a top plane of said framework slopes downward from a rear side of said crib to a front side of said crib, said top cover being connected to a top of said rear wall in hinged relationship whereby said top cover is moveable between open and closed positions for loading material into said crib, said floor having a slope for the drainage of water, said walls having mesh siding whereby air may pass freely therethrough, said top cover having solar glazing panels whereby solar heat and light are transmitted directly to an interior of said crib, said framework being provided with a plurality of access doors, at least one of said access doors being placed at a top portion of said rear wall whereby material may be placed within said crib, and at least one other of said access doors being placed at a bottom portion of one of said walls whereby material may be removed from said crib.

5. The crib according to claim 4 in which a conduit spans across and is supported by said framework within said crib, said conduit having perforations and being positioned in a sloping manner whereby air is introduced to said interior of said crib and moisture from said composted carcasses passed into said conduit from within said crib and is transported outside said crib.

6. A crib for composting animal carcasses, said crib comprising a framework for receiving carcasses defining four walls, a top cover and a floor, a rear wall of said framework being greater in height than a front wall of said framework whereby a top plane of said framework slopes downward from a rear side of said crib to a front side of said crib, said top cover being connected to a top of said rear wall in hinged relationship whereby said top cover is moveable between open and closed positions for loading material into said crib, said floor having a slope for the drainage of water, said walls having mesh siding whereby air may pass freely therethrough, said top cover having solar glazing panels whereby solar heat and light are transmitted directly to an interior of said crib, said framework being provided with a plurality of access doors, at least one of said access doors being placed at a top portion of said rear wall whereby material may be placed within said crib, and at least one other of said access doors being placed at a bottom portion of one of said walls whereby material may be removed from said crib, means being provided for aerating said material in said crib, said means comprising a tool having a handle at one end of an elongated rod and retractable lugs at another end, said lugs having means to be in a retracted, co-directional alignment with said rod when said rod is inserted into said material in said crib and in an extended, perpendicular alignment with said rod when extracted from said material, said tool being inserted into said material from a top opening of said crib when said top cover is in said open position, whereby said material is turned by said lugs when said tool is extracted.

* * * * *